United States Patent [19]

Olnowich et al.

[11] Patent Number: 5,920,704
[45] Date of Patent: Jul. 6, 1999

[54] DYNAMIC ROUTING SWITCH APPARATUS WITH CLOCKED SIGNAL REGENERATION

[75] Inventors: Howard Thomas Olnowich, Endwell; Donald George Grice, Kingston; Arthur Robert Williams, Croton-on-Hudson, all of N.Y.

[73] Assignee: International Business Machines Corporation, Armonk, N.Y.

[21] Appl. No.: 07/947,010

[22] Filed: Sep. 17, 1992

Related U.S. Application Data

[63] Continuation-in-part of application No. 07/677,543, Mar. 29, 1991, abandoned, and a continuation-in-part of application No. 07/799,497, Nov. 27, 1991, abandoned, and a continuation-in-part of application No. 07/799,602, Nov. 27, 1991, abandoned.

[51] Int. Cl.[6] .................................................... G06F 13/00
[52] U.S. Cl. ...................................... 395/200.68; 370/351
[58] Field of Search ................................... 395/800, 325; 370/62, 58.1, 60

[56] References Cited

U.S. PATENT DOCUMENTS

| 4,914,429 | 4/1990 | Upp | 395/325 |
|---|---|---|---|
| 4,965,788 | 10/1990 | Newman | 370/60 |
| 5,072,442 | 12/1991 | Todd | 370/62 |
| 5,163,138 | 11/1992 | Thirumalai | 340/825.8 |
| 5,231,631 | 7/1993 | Buhrke et al. | 370/60 |
| 5,274,768 | 12/1993 | Traw et al. | 395/275 |

OTHER PUBLICATIONS

IBM TDB vol. 33, No. 5, Oct., 1990, "Asynchronous Digital Video Switching System", by Farrell et al, pp. 227–233.

*Primary Examiner*—Meng-Ai T. An
*Assistant Examiner*—Walter D Davis, Jr.
*Attorney, Agent, or Firm*—Lynn L. Augspurger; Eugene I. Shkurko; Shelley M Beckstrand

[57] ABSTRACT

An asynchronous switching apparatus is enabled to reshape data pulses and eliminate skewing problems as data is transmitted through the switch. The switching apparatus still functions asynchronously and maintains all the advantages of asynchronous operation, such as, not requiring the alignment and distribution of a central clock, having no central point failure mechanisms, and allowing each node of the parallel system to function free of synchronization requirements with other nodes.

9 Claims, 11 Drawing Sheets

ALLNODE SWITCH IS CASCADABLE

FIGURE 1: MODIFIED ALLNODE SWITCHING APPARATUS INTERFACES
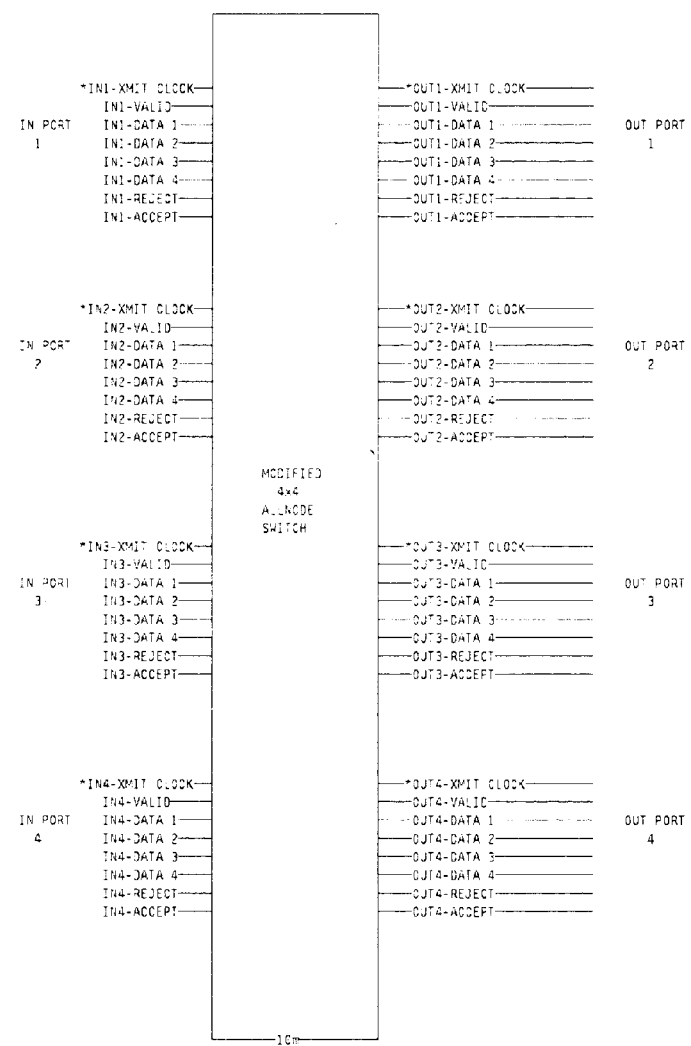
Note: * indicates interface signals added by the present invention FIGURE 2: Functional Diagram Switch-Based Parallel System
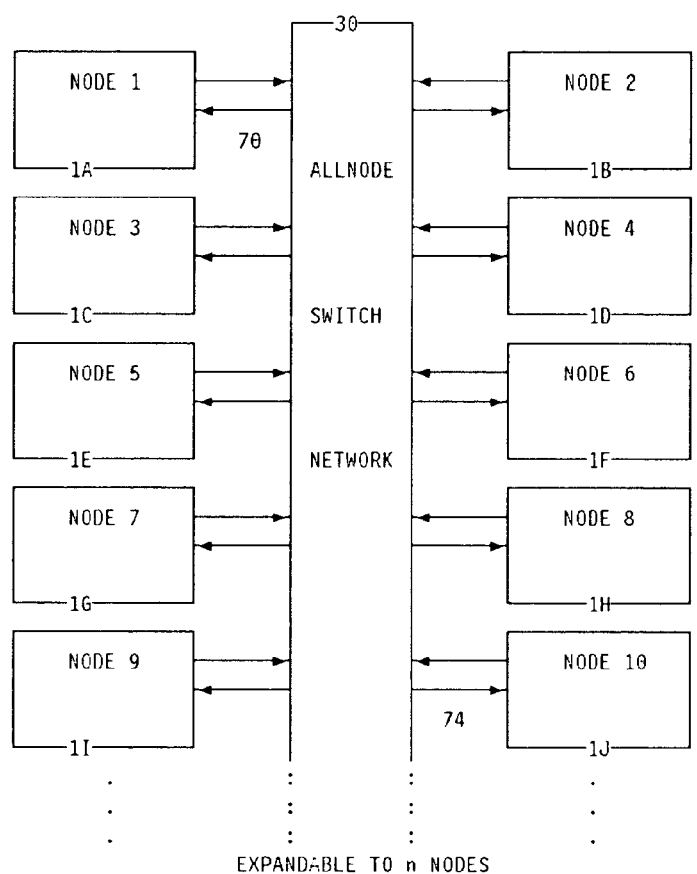

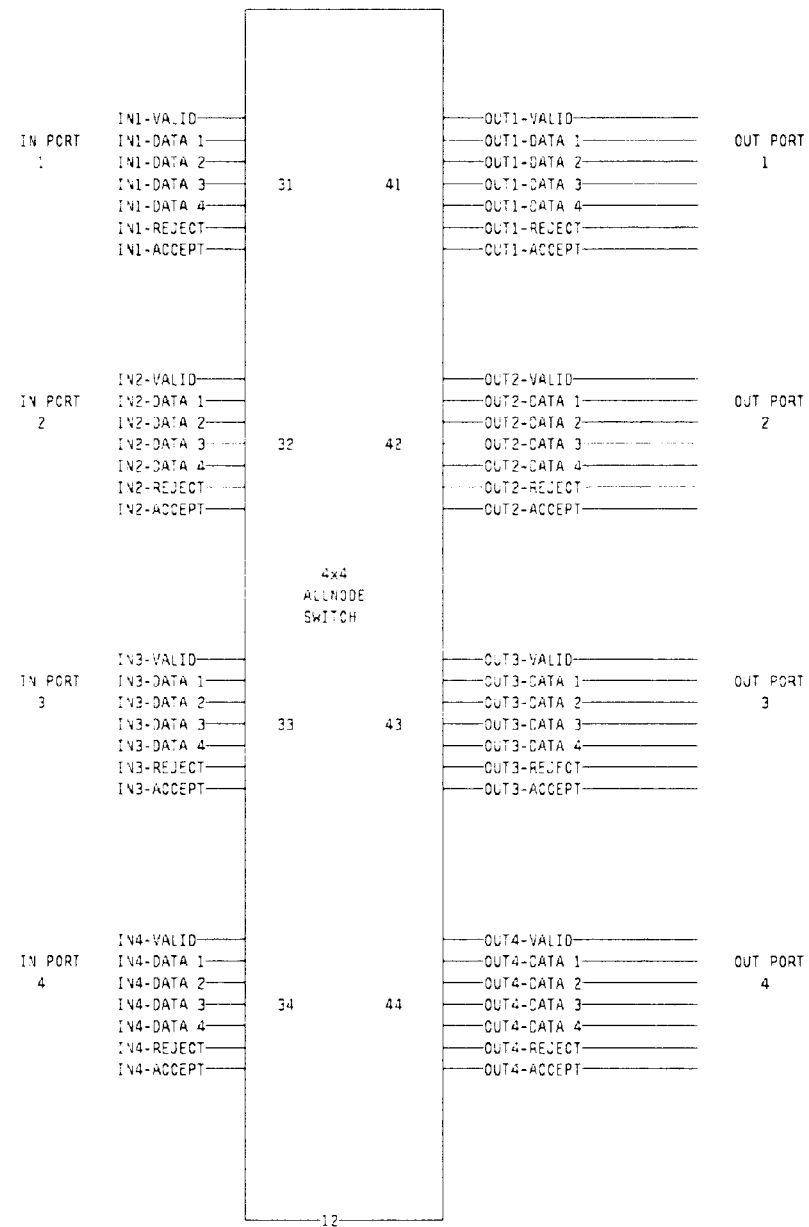
FIGURE 3: ALLNODE SWITCHING APPARATUS INTERFACES

FIGURE 4: ONE 4x4 ALLNODE SWITCH INTERCONNECTS 4 NODES
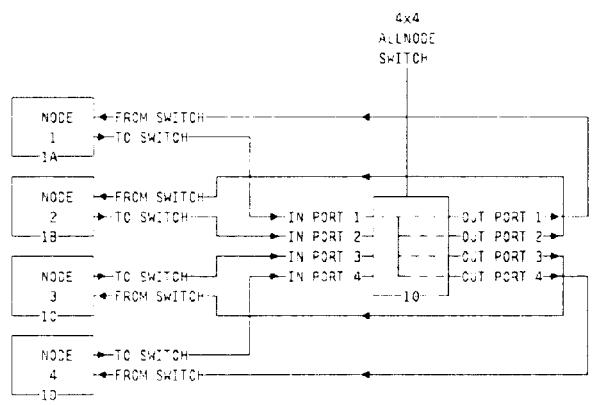

FIGURE 5: ALLNODE SWITCH IS CASCADABLE
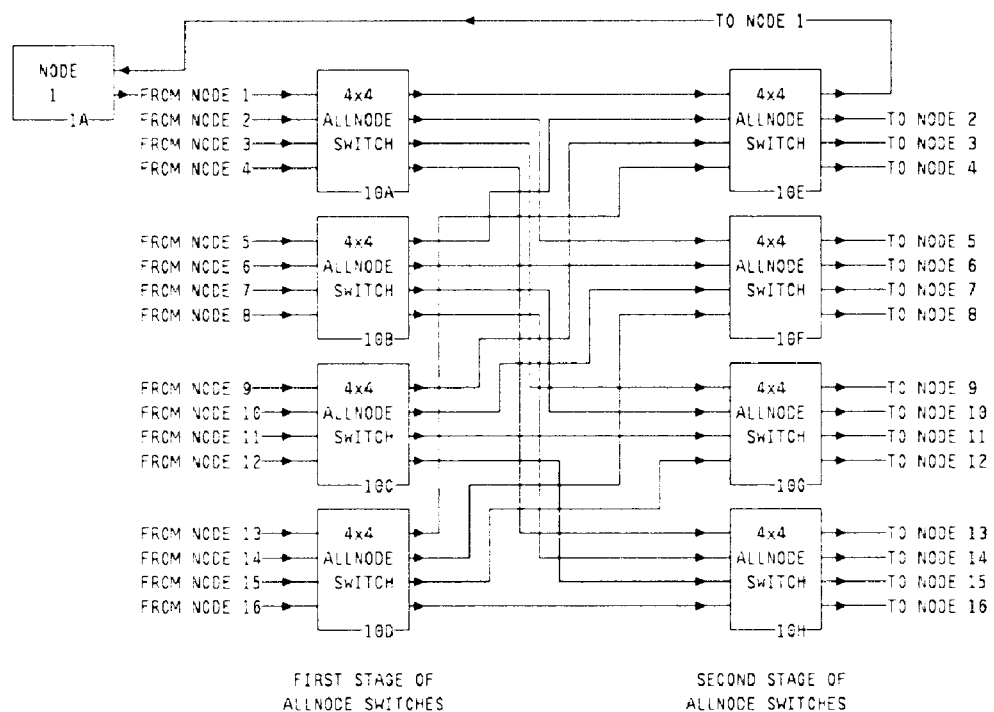
FIRST STAGE OF
ALLNODE SWITCHES
SECOND STAGE OF
ALLNODE SWITCHES

FIGURE 6: ALLNODE SWITCH FUNCTIONAL DIAGRAM
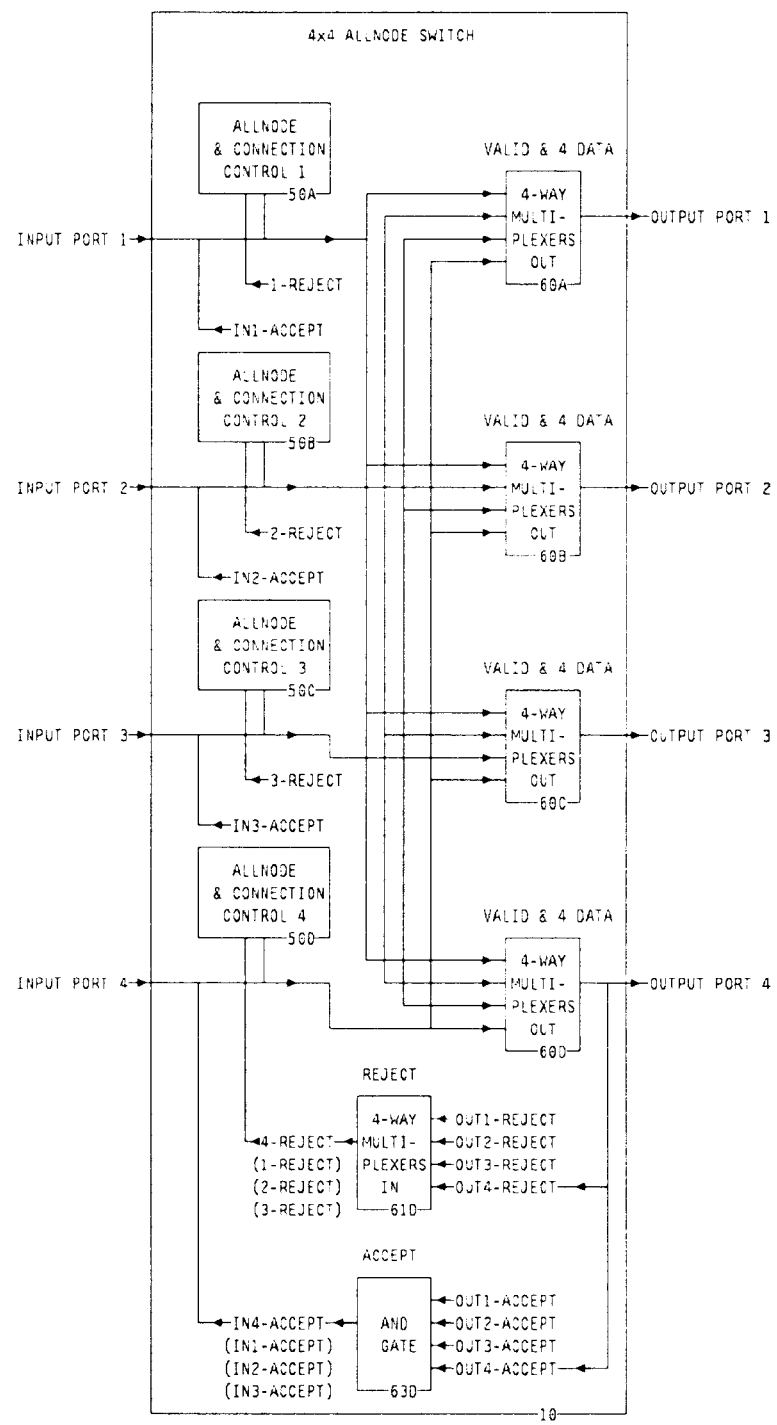

FIGURE 7: ALLNODE SWITCH TRANSFERS MULTI-LINE SERIAL DATA
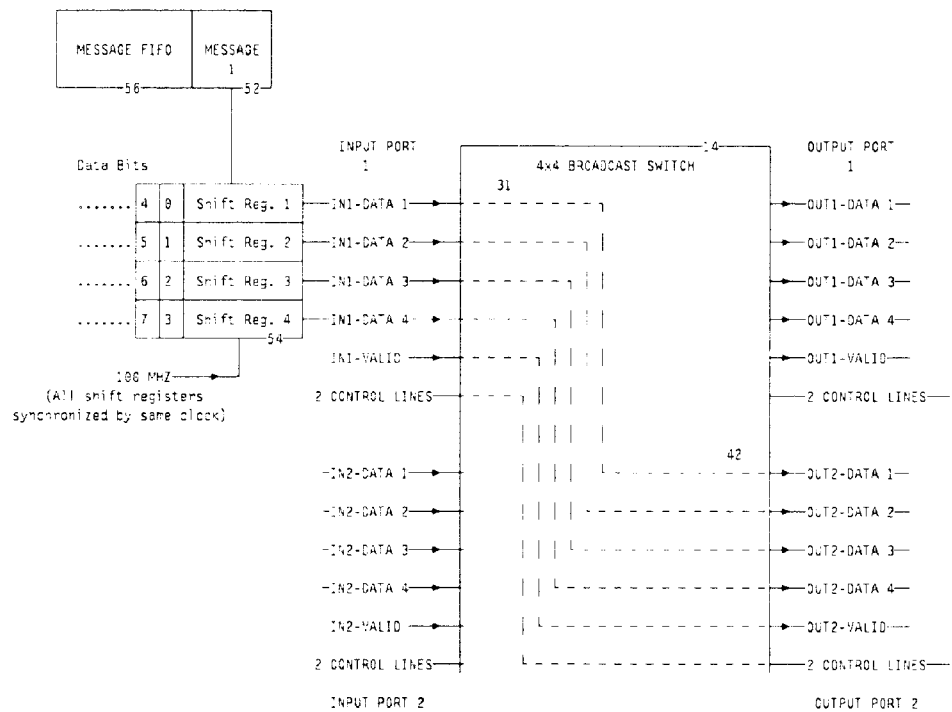

FIGURE 8: SWITCH INTERFACE TIMING
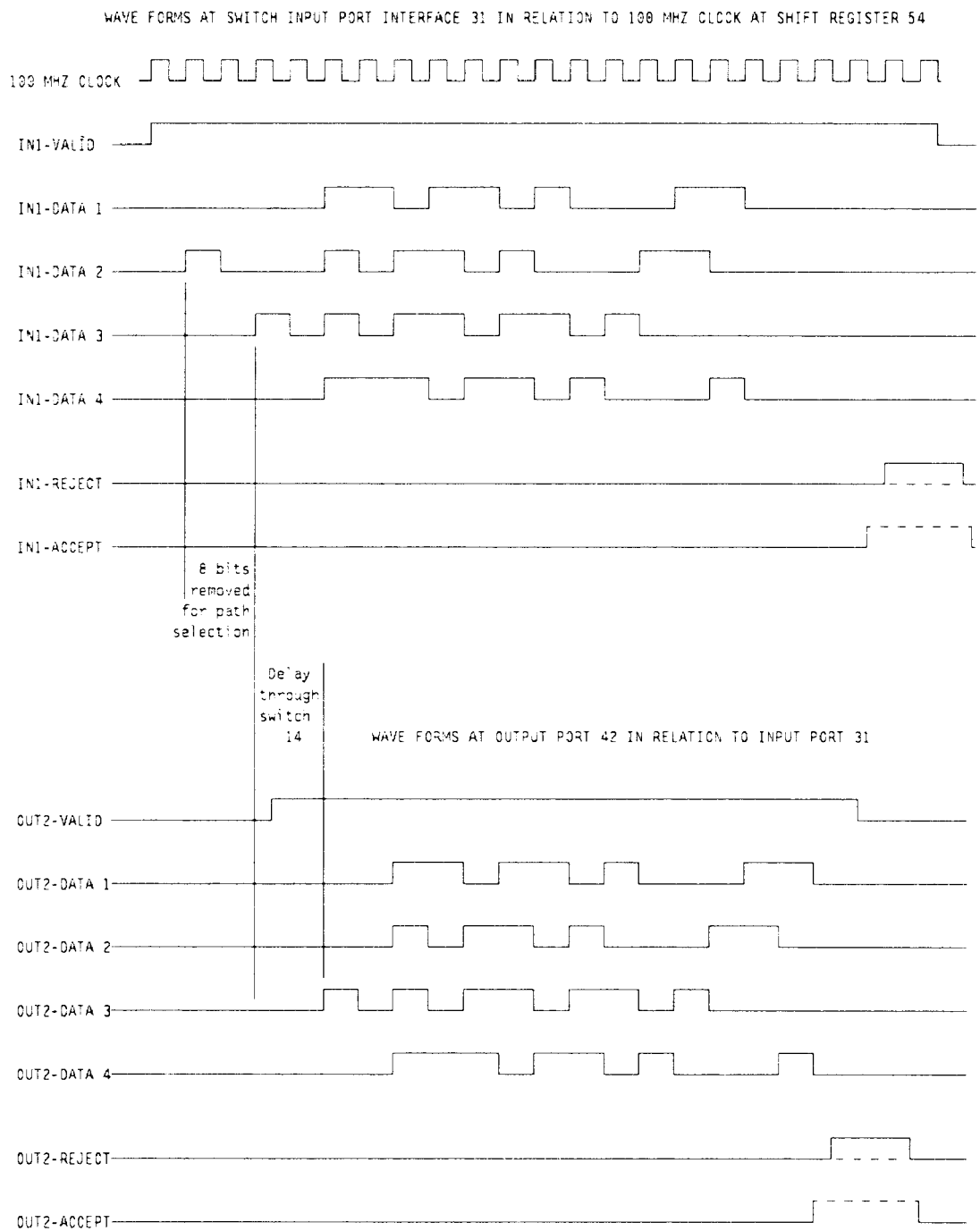

FIGURE 9: ALLNODE MULTI-STAGE ROUTING EXAMPLE
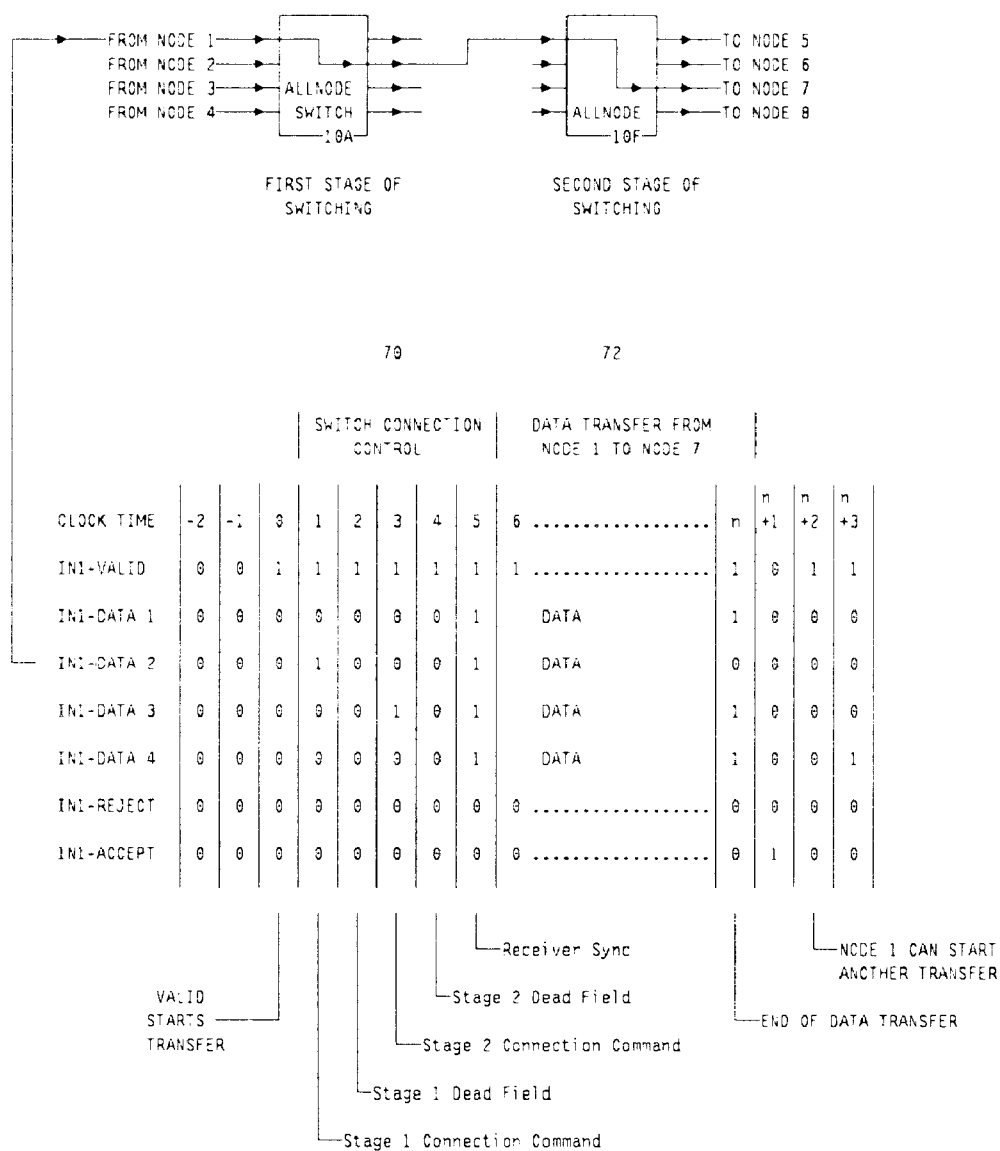

Figure 10: Signal Regeneration Logic
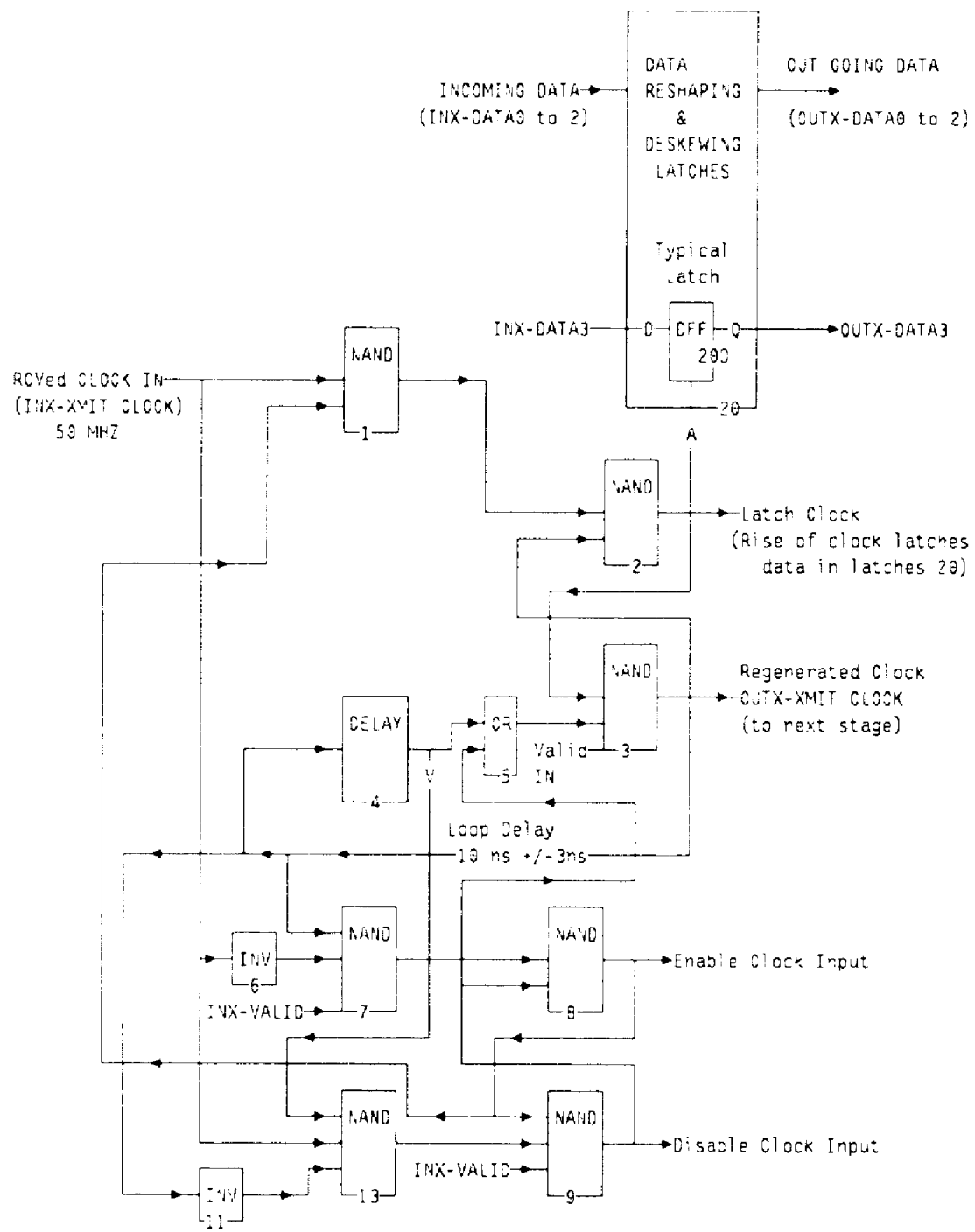

Figure 11: Signal Regeneration Timing
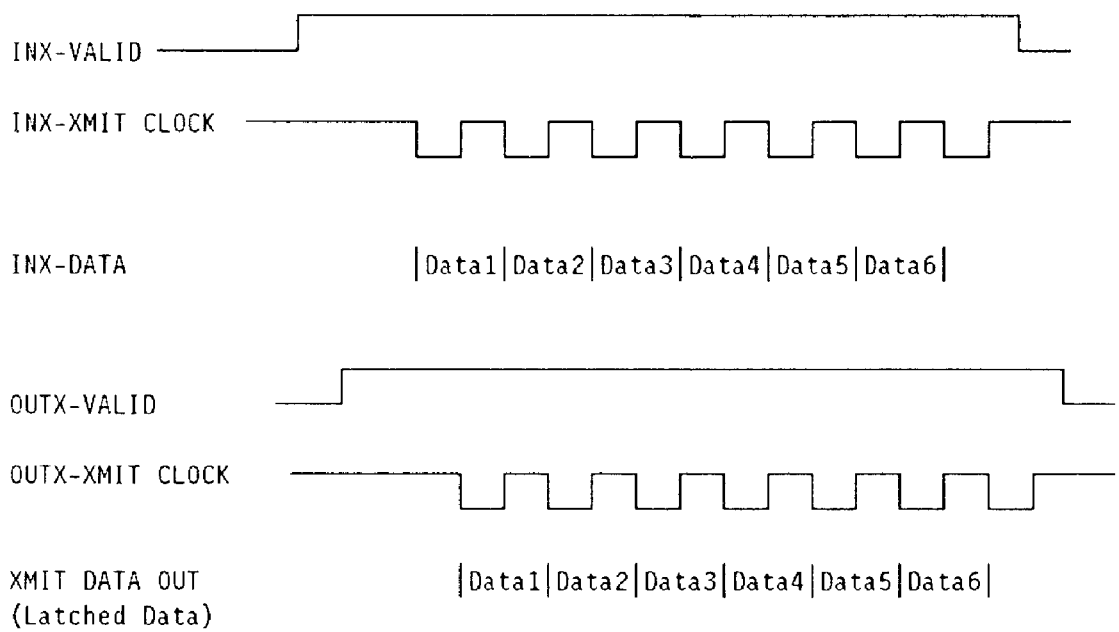
Notes: 1) OUTX-DATA changes at the fall of OUTX-XMIT CLOCK signal.
2) INX-DATA is received and latched at the rise of INX-XMIT CLOCK

20

DYNAMIC ROUTING SWITCH APPARATUS WITH CLOCKED SIGNAL REGENERATION

RELATED APPLICATIONS

The present United States patent application claims priority as a continuation in part application and is related to the following applications:

U.S. Ser. No. 07/677,543, filed Mar. 29, 1991, entitled "All-Node Switch, An Unclocked,, Unbuffered Asynchronous Switching Apparatus", by P. A. Franaszek et al., now abandoned, and U.S. Ser. No. 07/799,497, Filed Nov. 27, 1991, entitled "Multi-Function Network" by H. T. Olnowich, et al., now abandoned and U.S. Ser. No. 07/799,602, Filed Nov. 27, 1991, entitled "Multi-Media Serial Line Switching Adapter for Parallel Networks and Heterogenous and Homologous Computer Systems", by H. T. Olnowich, et al, now abandoned, The present application is also related to the following applications filed concurrently herewith:

U.S. Ser. No. 07/947,196, filed Sep. 17, 1992 now U.S. Pat. No. 5,384,773, entitled "Multi-Media Analog/Digital/Optical Switching Apparatus", by H. T. Olnowich et al, and, U.S. Ser. No. 07/946,204, filed Sep. 17, 1992 now U.S. Pat. No. 5,445,474, entitled "Switch-Based MicroChannel Planar Apparatus" by H. T. Olnowich et al, and, U.S. Ser. No. 07/946,512, filed Sep. 17, 1992 now abandoned, entitled "Switch-Based Personal Computer Interconnection Apparatus" by H. T. Olnowich et al, and, U.S. Ser. No. 07/947,644, filed Sep. 17, 1992 now abandoned, entitled "Slave MicroChannel Apparatus for Converting to Switch Architecture" by H. T. Olnowich et al, and, U.S. Ser. No. 07/946,506, filed Sep. 17, 1992 now abandoned, entitled "Master MicroChannel Apparatus for Converting to Switch Architecture" by H. T. Olnowich et al, and, U.S. Ser. No. 07/946,203, filed Sep. 17, 1992 now U.S. Pat. No. 5,408,646, entitled "Multipath Torus Switching Apparatus" by H. T. Olnowich et al, and, U.S. Ser. No. 07/946,513, filed Sep. 17, 1992 now U.S. Pat. No. 5,734,826, entitled "Variable Cyclic Redundancy Coding Method and Apparatus" by H. T. Olnowich et al, and, U.S. Ser. No. 07/947,023, filed Sep. 17, 1992, now issued as U.S. Pat. No. 5,245,229, entitled "Adaptive Switching Apparatus for Multi-Stage Networks", by H. T. Olnowich et al, and, U.S. Ser. No. 07/946,986, filed Sep. 17, 1992 now U.S. Pat. No. 5,404,537, entitled "Priority Interrupt Switching Apparatus for Real Time Systems", by H. T. Olnowich et al, and, U.S. Ser. No. 07/946,509, filed Sep. 17, 1992 now abandoned, entitled "Message Header Generation Apparatus for Parallel Systems" inventors H. T. Olnowich et al.

These applications and the present application are owned by one and the same assignee, International Business Machines Corporation of Armonk, N.Y.

The descriptions set forth in the previous applications and the concurrently filed applications are incorporated by reference.

FIELD OF THE INVENTION

The present invention relates to digital computer systems comprised of several or many computing and/or input/output elements, and the ability of the said individual elements to perform high speed, low-latency communications with each other in a parallel fashion over a multi-stage, switching interconnection network.

The present invention further relates to mutli-stage, circuit-switched networks without central clocking, and the ability to synchronize and recover digital data that is transferred over the network quickly and accurately.

GLOSSARY OF TERMS

Circuit-switched network
  A network where the individual switching elements comprising the network do not buffer the data messages, but pass them immediately as a direct connection from input to output.
Data Message
  A format for sending information between nodes of a parallel system incorporating the further ability to check the said information for accuracy using cyclic redundancy coding methods.
Data
  Another term for Data Message
Idle
  The state of a switch interface where it is not presently involved in the process of connecting two nodes.
Message
  Another term for Data Message
Node
  A functional element of the system comprised of one or more processors or input/output devices interconnected by a network.
Nodal element
  Another term for node, which has the same meaning.
NRZ
  Abbreviation for non-return to zero.
Port
  A single bi-directional entry and exit point to a switching netwrok.
Receiving Node
  A functional element which is receiving data transmitted over a network.
Sending Node
  A functional element which is transmitting data over a network.

BACKGROUND OF THE INVENTIONS

Parallel computing systems consist of a plurality of processors that communicate via an interconnection network. One popular network for providing the interconnection for a plurality of processors is the circuit-switched network comprised of multiple circuit switches. The state-of-the-art unbuffered circuit switch is the ALLNODE Switch (Asynchronous, Low Latency, inter-NODE switch), which is disclosed in U.S. Ser. No. 07/677,543. The Allnode switch as disclosed in U.S. Ser. No. 07/677,543 provides excellent low latency characteristics because it implements a minimum amount of circuitry at each switch stage of a multi-stage interconnection network. The latency across the switch is extremely fast because the equivalent of a straight wire connection is provided across each switch stage without involving any relatching at each switch stage. No relatching of data is required since the Allnode Switch supports a totally asynchronous transmission that does not require relatching or buffering at the individual switch elements. Therefore, the Allnode Switch delivers data messages being transmitted through the switch as quickly as possible avoiding the delays of any buffering.

The problem with the unbuffered, asynchronous method is that the data transmission pulses passing through each switch stage are not reshaped or realigned by a relatching process. As the signals pass through multiple switch stages, the original pulse shape can get distorted. Also, data that is transferred in parallel (such as byte wide transfers) can experience skew amongst the parallel data bits, because the parallel lines are not realigned at every stage of the network. These two problems of pulse distortion and skewing limit the frequency of the transmission and the number of stages of network that can be traversed before the pulses become too distorted or skewed to be reliable.

The solving of distortion and skewing problems can create other problems if not handled correctly, such as introducing too much latency or too much unreliability into the solution to make it viable. An important feature of the ALLNODE switch is that it is very reliable and there are no common signals or components in the switch that can fail the whole switch chip. Introducing a common clock used by every port of the switch is not an acceptable solution, because a failure of that clock would fail the entire switch chip. Also, since the ALLNODE switch is an asynchronous design, care must be taken not to use a solution that would increase the chances of encountering a metastability condition because of new metastability opportunities that could be created while attempting to solve the distortion and skew problem. The present invention discloses a method and apparatus for circumventing these problems, while solving the distortion and skewing problems.

The present invention is a modification and adaption of the ALLNODE switch, as disclosed the parent application, U.S. Ser. No. 07/677,543. We will further describe in the detailed description the relationship between the present invention and the parent application.

SUMMARY OF THE INVENTION

The invention is a method and apparatus for improving an asynchronous switching apparatus by enabling it to reshape data pulses and eliminate skewing problems as data is transmitted through the switch. The invention is the capable of permitting the switching apparatus to function asynchronously and to maintain all the advantages of asynchronous operation, such as, not requiring the alignment and distribution of a central clock, having no central point failure mechanisms, and allowing each node of the parallel system to function free a synchronization requirements with other nodes.

The disclosed approach is to add one signal line in the interface to each input and output port of an asynchronous switch for the purpose of transmitting a clock pulse with each data character sent to the switch. This has a minimum impact of adding one extra input/output connection to the switch chip for every switch input and output port, assuming the the switching apparatus is packaged using standard single chip technology. However, the approach eliminates any potential metastability at the switch itself for the latching function, holds the delay introduced by latching and reshaping the data to minimum per switch stage, and still maintains the important reliability and availablity requirements that there be no signals or clocks inside the switch chip that fanout to every port. This is because transmitting individual clock lines to/from each input/output port implements the relatching function as individual islands of logic. The result is there is nothing inside the switch chip that is shared amongst more than one or two ports that can fail and result in the taking out of more than 1 input and/or 1 output port.

The invention is a modification of the high speed and low latency switch interconnection techniques disclosed in the parent application, the ALLNODE Switch (Asynchronous, Low Latency, inter-NODE switch), which is disclosed in U.S. Ser. No. 07/677,543. The parent Allnode Switching apparatus provides a switching network communication structure that has the characteristic of simplicity of implementation, and does not require data buffering or data conversion of any kind. It establishes or breaks connections instantaneously and is, therefore, dynamically changeable with a very quick response time. It has the capability of resolving requests to establish connections in a parallel manner, where n connections can be established or broken at the same time (where n=the number of elements of the system which are communicating via the switching network). Thus, the number of connections that can be made or broken simultaneously scales directly with the size of the system. This capability enables the invention apparatus to handle multiple short messages very efficiently. In addition, the new apparatus is devoid of synchronization requirements or wire length restrictions. It also has the ability to track the speed improvements of new technologies and to increase performance as the technology used to implement the invention apparatus improves.

The present invention includes a new clock reshaping circuit, which eliminates the need for a central switch clock that can fail the entire switch chip. The invention adds ½ clock of latency per switch stage which can be attributed to the relatch, reshape, and deskew functions. This slightly diminishes the low latency goals of the parent ALLNODE switch. However, even with these new features added, the revised ALLNODE switch still has orders of magnitude better latency than other state-of-the-art switches.

BRIEF DESCRIPTION OF THE DRAWINGS

FIG. 1 illustrates generally our preferred embodiment of the modified asynchronous switching apparatus and the interface required to enable the reshaping of data pulses and the eliminating of skewing problems.

FIG. 2 illustrates generally the method used to interconnect multiple nodes of a parallel system using a switching network.

FIG. 3 illustrates the parent four input and four output (4×4) crossbar switching apparatus, which operates asynchronously and has the capability of being modified to provide the disclosed improvements.

FIG. 4 illustrates the interconnections required to a four input and four output (4×4) crossbar switching apparatus to provide full interconnection amongst four nodes.

FIG. 5 shows a typical method for cascading the 4×4 asynchronous switching apparatus devices to accomodate parallel systems having more than 4 nodes.

FIG. 6 shows a schematic block diagram of the simple digital data flow and control path implementations of the 4×4 asynchronous switching apparatus, which has the capability of being modified by the present invention to provide fully parallel switching means for interconnecting up to four system nodes for the purpose of transferring digital data.

FIG. 7 illustrates a typical method for generating parallel control and and multiple line serial digital data information to be sent to the 4×4 prior parent embodiment of the invention switching apparatus over four synchronous data lines.

FIG. 8 shows a typical timing diagram for routing the digital interface signals arriving at one input port of the 4×4 prior parent embodiment of the invention switching apparatus to one output port.

FIG. 9 illustrates the typical method of selecting and establishing a transmission path through a network comprised of the invention switching apparatus for the purpose of sending digital data from one node to another.

FIG. 10 shows a schematic block diagram of the logical implementation of the disclosed signal regeneration apparatus.

FIG. 11 shows a timimg diagram of the reshaping and deskewing functions performed at each switch input port by the disclosed signal regeneration apparatus.

DETAILED DESCRIPTION OF THE PREFERRED METHOD and EMBODIMENT

The invention is a modification of the high speed and low latency switch interconnection techniques disclosed in the parent application, the ALLNODE Switch (Asynchronous, Low Latency, inter-NODE switch), which is disclosed in U.S. Ser. No. 07/677,543. FIG. 1 illustrates generally our preferred embodiment of modifying the asynchronous Allnode switching apparatus 10m to enable the reshaping of data pulses and the eliminating of skewing problems.

The disclosed approach is to add one signal line in the interface to each input and output port of the parent Allnode switch. FIG. 1 shows the added signal to be the INX-XMIT CLOCK signal at the switching apparatus 10m input ports, and the OUTX-XMIT CLOCK signal at the switching apparatus 10m output ports, where X is the associated port number. Each additional signal contains a transmitted clock signal that accompanies the data and control signals at each port that are normally provided to the Allnode Switch. The result is the transmitting of a clock pulse with each data character sent to or from the switch. This has a minimum impact of adding one extra input/output connection to the switch chip for every switch input and output port, assuming the the switching apparatus is packaged using standard single chip technology.

Referring to FIG. 2, the preferred embodiment for interconnecting n parallel nodes via a multi-stage, interconnection network 30 using switching elements is shown. The preferred switching elements of network 30 is the basic asynchronous and unbuffered Allnode switching concept disclosed in the parent application U.S. Ser. No. 07/677,543. The Allnode Switching apparatus provides a switching network communication structure that has the characteristic of simplicity of implementation, and does not require data buffering or data conversion of any kind. It establishes or breaks connections instantaneously and is, therefore, dynamically changeable with a very quick response time. It has the capability of resolving requests to establish connections in a parallel manner, where n connections can be established or broken at the same time (where n=the number of elements of the system which are communicating via the switching network). Thus, the number of connections that can be made or broken simultaneously scales directly with the size of the system. This capability enables the invention apparatus to handle multiple short messages very efficiently. In addition, the new apparatus is devoid of synchronization requirements or wire length restrictions. It also has the ability to track the speed improvements of new technologies and to increase performance as the technology used to implement the invention apparatus improves. In addition, the Allnode switching apparatus can be cascaded with other identical apparatus devices to form interconnection networks among any number of system elements or nodes. Said network 30 would have the characteristics for full parallel interconnection.

The preferred embodiment uses only unidirectional interfaces, and therefore FIG. 2 shows the switch interface 70 to be comprised of two unidirectional sets of lines, one carrying data from node 1A, and one carrying data to the switch network from node 1A, and one carrying data from the switch network to node 1A.

4×4 Crossbar of Allnode Switch—FIGS. 3–9

It is here understood that the FIGS. 3 to 9 are illustrations which are common to U.S. Ser. No. 07/677,543, the parent application which is incorporated herein by reference as to all of its contents. FIGS. 3 to 9 refer to a 4×4 crossbar implementation of the ALLNODE Switch to illustrate the principles and speed of the switching concept.

Referring to FIG. 3, the preferred embodiment is a 4×4 switching apparatus 12, where the function of the present invention is to provide a means of connecting any of 4 sets of digital, analog, or optical inputs on a mutually exclusive basis to any one of the unused 4 output ports. The 4×4 switching apparatus 12 can support up to 4 simultaneous connections at any given time. For instance, Input 1 could be connected to Output 3, Input 2 to Output 4, Input 3 to Output 2, and Input 4 to Output 1.

The invention switching apparatus 12 is unidirectional, which means that data flows in only one direction across the said switching apparatus 12, that being from input to output. Switching apparatus 12 interfaces are defined in detail in FIG. 3. The set of lines 31, 32, 33, and 34 at each in-port to the switching apparatus 12 are identical in number and function to the set of lines 41, 42, 43, and 44 at each out-port. The sets of interface lines to each input and output port contain seven unique signals: 4 digital data lines, and 3 digital control lines (VALID, REJECT, and ACCEPT). The signals at each port are differentiated by a prefix of INX- or OUTX- indicating the direction and number of the port (X) that they are associated with. The four digital data and one VALID lines have a signal flow in the direction going from input to output across switching apparatus 12, while the digital REJECT and ACCEPT control lines have a signal flow in the opposite direction.

Each unidirectional switch interface set requires only 7 signals, as shown in FIG. 3, to transmit and control and data through the network 30—the digital data and control transfer width is ½ byte (4 bits) at a time. The signals required are:

DATA: 4 parallel signals used to command switch connections and transmit digital data messages or digital control headers.

VALID: When active, indicates that a digital message, control header, or analog waveform is in the process of being transmitted. When inactive, indicates a RESET command and causes all switches to reset to the IDLE state.

REJECT: Signal flow is in the opposite direction from the DATA and VALID signals. When active, it indicates that a REJECT or error condition has been detected.

ACCEPT: Signal flow is in the same direction as the REJECT signal.

When in the low state, it indicates that a message is in the process of being received and checked for accuracy. When active, it indicates the message has been received correctly.

As illustrated by FIG. 4 the ALLNODE switching apparatus would be provided for a node having a plurality of input and output ports, and would comprise the connection control circuit for each input port, and a multiplexer control circuit for each output port for connecting any of I inputs to any of Z outputs, where I and Z can assume any unique value greater or equal to two, as in the parent application.

FIG. 4 shows a 4×4 crossbar ALLNODE switching apparatus, where the ALLNODE switching apparatus 10 is unidirectional, which means that data flows in only one direction across the said switching apparatus 10, that being from input to output. Although the said switch apparatus 10 is unidirectional, it supports bidirectional communication amongst four nodes (1A, 1B, 1C, and 1D) by connecting the 4×4 ALL-NODE switching apparatus 10 as shown in FIG. 3. Each node 1A, 1B, 1C, and 1D has two sets of unidirectional interconnecting wires, one going to the switch 10 and one coming from the switch 10. The dashed lines internal to the switching apparatus 10 indicate that the function of the said switching apparatus is to connect an input port such as INPUT PORT 1 to one of four possible output ports. The switching apparatus 10 provides exactly the same function for each input port, allowing it to be connected to any unused output port.

Referring to FIG. 5, a method is illustrated for increasing the number of nodes in a system by cascading eight switching apparatus 10 blocks. The eight cascaded switches are denoted as 10A through 10H to indicate that they are identical copies of switching apparatus 10, varying only in regards to the wiring of their input and output ports. It can be noted that any of sixteen nodes can communicate to any other node over a connection that passes through exactly two of the switching apparatus 10 blocks. For instance, Node 5 can send messages to Node 15 by traversing switch 10B and switch 10H. Since all connections are made through two switching apparatus 10 blocks, the network comprised of the eight switching apparatus 10 blocks is referred to as a two stage switching network. Other multi-stage networks can be configured from switching apparatus 12 blocks by using three stages, four stages, etc. in a similar manner.

Referring to FIG. 6, a functional diagram of the simple data flow across ALLNODE switching apparatus 10 is illustrated. The VALID and four data lines at each input port, inside the switch, and at each output port are represented by a single line in FIG. 6 for simplicity. For instance, the VALID and four data lines entering switch 10 at IN PORT 1 go to five internal functional blocks of switching apparatus 10; these are blocks 50A, 60A, 60B, 60C, and 60D. Block 50A makes the decision as to which of the four possible output ports are to be connected to input port 1. The VALID and four data lines from each input port go to each output multiplexer block (60A, 60B, 60C, and 60D); this makes it possible to connect any input port to any output port. Each of the four output multiplexer blocks (60A, 60B, 60C, and 60D) is uniquely commanded from each of the control blocks (50A, 50B, 50C, and 50D) as to which of the four possible sets of input port lines is to be gated through to each output port. For instance, control block 50A can command multiplexer 60C to connect input port 1 to output port 3; control block SOB can command multiplexer 60A to connect input port 2 to output port 1; and control block 50C can command multiplexers 60B and 60D to connect input port 3 in a multi-cast fashion to output port 2 and output port 4. All three connections are capable of being established simultaneously or at different times. At the same time that multiplexers 60A to 60D form connections to move the VALID and data signals across switch 12 with a unidirectional signal flow from input port to output port, multiplexer 61D and AND gate 63D form signal connections for the REJECT and ACCEPT signals, respectively, with a signal flow in the opposite direction of output port to input port (typical implementations are shown by blocks 61D and 63D—similar blocks are associated with each input port). These REJECT and ACCEPT signals provide a positive feedback indication to switch 10 of actions taken either by subsequent switch 10 stages in a cascaded network or by the device receiving and interpreting the VALID and four data signals. A control header or digital message being transmitted through switching apparatus 10 over the four data signals under control of the VALID signal can be REJECTed by any network stage if it is unable to establish the commanded connection or by the receiving device if it is not capable of receiving the message at this time or if it detects an error in the transmission. The receiving device also has the capability of confirming the correct arrival of a command or message (without errors being detected) by pulsing the ACCEPT signal. Since the REJECT and ACCEPT signals go in the opposite direction from the data flow, they provide a means of reporting back a positive indication to the sender on whether the attempted transmission was received correctly or rejected.

Referring to FIG. 7, blocks 56, 52, and 54 illustrate a typical method for generating multi-line (parallel)/serial digital data in the form of a message which can be transmitted to and across switching apparatus 14, which is a partial drawing of the switching apparatus 12. Similar parallel/serial data generation logic as provided by 56, 52, and 54 can be used at each of the other input ports to switching apparatus 12. Each set of input data lines provides 4 serial data lines to a given input port which is synchronized to the same clock by the four shift registers 54 which create the parallel/serial data by shifting four synchronized lines of data 31 as controlled by the same identical clocking signal (100 MHZ in FIG. 6). However, the four different input port sources (31, 32, 33, and 34 of FIG. 3) to switching apparatus 14 can be asynchronous to each other, being based on different, non-synchronized, 100 MHZ clocking signals.

The process for sending parallel/serial messages through switching apparatus 14 involves FIFO 56, which accumulates data messages to be transmitted. The next entire message to be transmitted is moved to buffer 52. The message stored in buffer 52 is moved to shift registers 54 in preparation for transmittal and the data is dispersed across the four shift registers 54 by placing data bit 0 into the first bit of shift register 1, data bit 1 into the first bit of shift register 2, data bit 2 into the first bit of shift register 3, data bit 3 into the first bit of shift register 4, data bit 4 into the second bit of shift register 1, etc. Shift registers 54 then begin to send serial data to switching apparatus 14 over four synchronized data lines, in such a manner that the parallel/serial data flows continuously until the entire message has been transmitted. The switch apparatus 14 uses the first eight bits transmitted (in the first two clock cycles of serial data over interface 31 from serial registers 54 to switching apparatus 14) to select and establish a connection path through the switching apparatus 14. The example in FIG. 7 illustrates via dashed lines, the switching apparatus establishing a temporary connection between input port 1 (31) and output port 2 (42), such that each of the eight individual lines in interface 31 are uniquely and directly connected to each of the corresponding lines in interface 42.

Referring to FIG. 8, typical serial waveforms are shown for both input and output ports of the switching apparatus 14. The switch removes the first 8 bits of the serial transmission as sent by shift registers 54 and uses them to make and hold a connection, such as interface 31 to interface 42. The remainder of the serial message in our example is transferred directly from interface 31 to interface 42, so that interface 42 sees that exact same message that interface 31 receives, minus the first 8 bits and delayed by the circuit delays encountered by the serial data as it traverses the switching apparatus 14. Switching apparatus 14 does not buffer or re-clock the serial data entering via interface 31 in any manner; it merely reflects as quickly as possible the input waveforms it receives over interface 31 to output interface 42 without changing them in any way, except to strip off the first 8 bits.

The convention for indicating to a switch 14 input port over an interface (such as 31) that there is no transfer in progress, is to issue continuous IDLE commands, which are denoted by the 4 data lines and the VALID control line being held at logical 0's. The detection of a logical 1 on any of the input lines will signify the departure from the IDLE state and signify to the switch that a selection and transfer is beginning. Likewise, the output lines from the switch will be held in the IDLE state (at all 0's), when there is no active transfer in progress.

In general, all switches require a path selection method, whereby they are commanded which connection (input port to output port) to establish. For switching apparatus 10, the path selection command is transmitted to the switch over the same interface that the data is transferred; i.e., the 4 data lines associated with each input port. Selection information must be transferred prior to the data, so that the commanded interconnections can be established and the data can then flow to the commanded destination. The selection information need NOT identify an input port number (1 to 4), because it is arriving at the switch over a specific input and the switch already knows what input number it is receiving data on. Therefore, the selection information need ONLY specify the number (1 to 4) of which one of the four output ports of switching apparatus 10 to which to connect. The method of path selection recommended here is one out of N encoding with a return to zero (called a DEAD FIELD).

Signal Regeneration Apparatus—FIGS. 10–11

Referring to FIG. 9, a typical example of the exact serial bit patterns and control signal activation is shown for sending control and digital data information to switching apparatus 10. The example references the cascaded, two stage switching network shown in FIG. 5 and involves sending data across the network from node 1 through switching apparatus 10A and 10F to node 7. To make this connection, input port 1 must be connected to output port 2 of the first stage switching apparatus 10A, and input port 1 must be connected to output port 3 of the second stage switching apparatus 10F. The signal sequence that is sent to input port 1 to cause the desired connections in switching apparatus 10A and 10F is shown in FIG. 5. In the signal sequence of 1's and 0's, time advances from left to right, so that the values seen at clock time −2 arrive at switch 10A first, and the values at clock time −1 arrive second, etc. The values of the IN1-DATA and IN1-VALID lines are all zeroes and cause nothing to happen at switch 10A during times −2 and −1, because they indicate IDLE. At clock time 0, the IN1-VALID line goes to a logical 1. This prepares switch 10A by enabling the input port 1 to receive data, but no connection or action takes place at switch 10A at this time. The IN1-VALID control line basically enables the corresponding switch input port; when IN1-VALID is a logical 0, switch 10A cannot make any connections or receive any data from input port 1, which is held RESET. Finally, at clock time 1, switch 10A receives its command as to what output port to connect to; the command is received entirely during clock time 1.

The command bit pattern sent at clock time 1 is used by switch 10A to establish connection to an output port; this process is referred to as a path selection operation and takes place completely internal to switch 10A. The path selection approach implemented by the present ALL-NODE switch invention is to let each of the 4 IN1-DATA lines to define a unique output of switch 10A to be selected. For instance, IN1-DATA1 signal going to a logical 1 at time 1 tells switch 10A to connect to output port 1, IN1-DATA2 commands connection to output port 2, etc. In our example, since IN1-DATA2 goes to a logical 1 during clock time 1, switch 10A is thereby commanded to connect to output port 2. In other words, the connection algorithm is that the first data input line going to a logical 1 after an input port has been enabled, defines the connection which that input port is to make. This is a mutually exclusive process, in that for the normal case only one data line at clock time 1 is allowed to be a logical 1; the other 3 data lines must be 0's. Note that since 1 bit of selection information is guaranteed to be a logical 1, switch 10A will be able to recognize the start of a transmission without requiring any additional bits to signify that a transfer is commencing. The switch 10A makes the commanded connection by removing the 4 bits from the data lines and storing them in a selection register in control block 50A of FIG. 8. The bits transmitted during clock time 1 are not passed through switch 10A to switch 10F, but instead switch 10A begins passing the very next 4 bits of data corresponding to clock time 2 to the next switch 10F. However, the information bits following a selection command (those transmitted by the 4 data lines at clock time 2 in our example) must always be all zeroes (a DEAD FIELD) as shown in FIG. 8. The purpose of this will be explained subsequently.

At clock time 2, the connection of switch 10A input port 1 to output port 2 is established and causes the signal sequence at clock time 2 to be transmitted across switch 10A and the interconnecting wires to switch 10F input port 1. From this time on, switch 10A merely transmits all subsequent data immediately to switch 10F input port 1; it never examines or takes any action on any other data patterns presented to switch 10A over its input port 1 interface. It just passes all data patterns it receives over input port 1 immediately to the output port 2 and switch 10F. Thus, at clock time 2, assuming zero delay across switch 10A and its associated cable, switch 10F input port 1 sees the VALID signal rise and the all zeroes DEAD FIELD on the 4 data lines coming into switch 10F input port 1. In this way, at time 2, switch 10F input port 1 is enabled in an identical manner to the way switch 10A input port 1 was enabled previously at time 0.

In our example, IN1-DATA3 goes to a logical 1 during clock time 3 and switch 10F is thereby commanded to connect its input port 1 to its output port 3, in a manner similar to the way switch 10A was commanded to connect its input port 1 to its output 2 during clock time 1. The switch 10F in making the commanded connection, removes the 4 bits at clock time 3 from the data lines, and stores them in the selection register which is part of control block 50A of FIG. 5. The bits transmitted during clock time 3 are not passed through switch 10F to Node 7, but instead switch 10F begins passing the very next 4 bits of data corresponding to clock time 4 to Node 7. However, the information bits following a selection command (those transmitted by the 4 data lines at clock time 4 in our example) must always be all zeroes (a DEAD FIELD) as shown in FIG. 8. Thus, by clock time 4, switches 10A and 10F have established a connection path for transferring data directly from Node 1 to Node 7. Up to clock time 5, Node 7 sees nothing but IDLE commands. At time 4, Node 7 sees the OUT3-VALID line from switch 10F go active and is thereby enabled to start receiving data at time 5. From time 5 on, Node 7 can receive data from Node 1 over the 4 OUT3-DATA lines from switch 10F. The protocol of the actual data being transmitted can be any of the normal formats such as manchester encoded, 8/10 bit encoding with preamble, etc. However, the preferred embodient, as shown in FIG. 8 is an all ones synchronization field at time 5, followed by the NRZ data message. The data message can specify the word count length of the transfer. The purpose of the synchronization field of all ones as a prefix to the actual data message, is to enable the receiving node 7 to synchronize to the sending node 1 in one clock time. This assumes that the two nodes involved in the data transfer have clocking systems that are asynchronous to each other, but are operating at the same frequency within a specified tolerance.

The preferred embodiment is to transmit the word count length of the message first during clock time 6 and clock time 7. Node 7 then decrements the length count and can detect when the transfer is complete. Node 7 can then check the message for accuracy using the selected error detection method (parity, ECC, or CRC). If the message has been received correctly, Node 7 responds by activating the ACCEPT interface line back to switch 10F at clock times n+1 and n+2. Switch 10F passes the ACCEPT indication back to switch 10A, which in turn returns it immediately to Node 1. This indicates to Node 1 that the transfer completed successfully, and Node 1 resets its VALID and 4 data lines to switch 10A to zeroes, thus, completing the data transfer and returning to the IDLE state. The IN1-VALID input line to switch 10A going to a zero at time n+3, causes switch 10A input port 1 to break its connection to output port 2and to return to the IDLE state. Immediately, switch 10F sees its IN1-VALID input line go to a zero, breaks its connection to output port 3 and returns to the IDLE state. Thus, the connections can be broken and the switches returned to IDLE in as little as one clock time. If Node 1 has another message to transmit, it can load the next message into buffer 52 and shift registers 54 (FIG. 7), and begin transmission to Node 7 or any other node as soon as time n+4. The only restriction is that the VALID signal generated by Node 1 must return to zero for a minimum of one clock time (time n+3) to signify the end of one transfer before beginning another.

If Node 7 finds an error in the message it has received after the word count has gone to zero at clock time n, it responds by activating the REJECT interface line (instead of ACCEPT) back to switch 10F. Switch 10F uses the incoming REJECT signal from Node 7 to break its connection to Node 7, to return to the IDLE state, and to pass the REJECT indication back to switch 10A, which in turn returns it immediately to Node 1 after breaking its connections and returning to IDLE. Node 1 then notes that the transfer has been rejected, and returns to the IDLE state by resetting its VALID and 4 data lines to switch 10A to zeroes. Node 1 may then retry the transmission by reloading shift registers 54 from buffer 52 and starting the transmission over again from the very beginning (clock time −1). The retransmission can occur over the identical path as the previously rejected transmission, or if alternate paths through the network are implemented another path can be tried. If continuous REJECTs are encountered, such that a specified number of REJECTs occur for the same message, an error reporting mechanism may be invoked.

It is also possible for any switch 10 in a network path to REJECT a message. This can occur for either of two cases:

1) BUSY-If the output port to which the switch is commanded to connect is BUSY (i.e., it is being used by a previously established connection), the switch will signify this condition to the input port issuing the command by activating the REJECT line back to the previous network stage or to the transmitter (if the first stage of the network detects BUSY). For instance, in the example shown in FIG. 8, if 10A had received a command at clock time −2 to connect input port 4 to output port 2, that connection would have been active when input port 1 requested to be connected to output port 2 at clock time 1. In this case, output port 2 is BUSY at clock time 1 and switch 10A would activate the IN1-REJECT line to Node 1. As described above, the transmitter may retry any REJECTed message.

Likewise, the connection could be made successfully at switch 10A, yet output port 3 of switch 10F could be BUSY at clock time 3, causing switch 10F to issue the REJECT signal to switch 10A. This, in turn, causes switch 10A to return REJECT immediately to Node 1 after breaking its connections and returning to IDLE.

2) Simultaneous CONTENTION-Rather than input port 4 establishing a connection to output port 2 in switch 10A at clock time −2 as described above (in advance of the same command from input port 1 at clock time 1), it is possible for two or more input ports to try to connect to the same output port at approximately the same time. This is called CONTENTION for an available output port. For instance, suppose input ports 1 and 4 both sent simultaneous commands at clock time 1 requesting to be connected to output port 2. The present invention resolves this contention by first connecting both contending input ports 1 and 4 to output port 2. The net effect is to electrically connect the 2 input ports to output port 2, which will logically OR the signals coming from both sources. During clock time 2 the logical OR of the 2 input ports will NOT cause an error, because the values present on both input ports 1 and 4 are identical: the VALID lines for each are logical 1's and the data lines for each contain the DEAD FIELD (logical 0's). However, at clock time 3, the signals from each source could be different and an error could be caused if the 2 input ports both remained connected at clock time 3 and later. In other words, switch 10A has 1 cycle time (clock time 2) to correct the decision it made to connect two or more inputs to the same output. Switch 10A makes this correction during clock time 2 by detecting the fact that more than one input is connected to a given output. It then takes action by resetting all but one of the multiple connections, and does this before clock time 3 occurs. The decision of which connection(s) to reset and which one to keep is a decision based on priority. For the preferred embodiment, a simple priority scheme is used as follows: If input port 1 is contending it gets the connection, If input port 1 is not contending and input port 2 is, input port 2 gets the connection. If input ports 1 and 2 are not contending and input port 3 is, input port 3 gets the connection. Input port 4 gets the connection only if no other input port wants it. Applying the priority selection to our example, input port 1 gets to keep its connection to output port 2, while the connection of input port 4 to output port 2 is reset during clock time 2. This results in the REJECT signal being issued in the normal fashion from switch 10A to input port 4.

Thus, the purpose of the DEAD FIELD in the present invention is to allow one clock time per switch stage to resolve simultaneous contention. The secondary purposes of the DEAD FIELD are to cause a falling edge on the selection bit which was active during the previous clock time, and to compensate for timing skew which might be present across the 4 data lines carrying serial selection data to the cascaded switches. Both the rise and fall of data bits commanding the switches to make connections gives the unclocked switch two clock edges (rise and fall) on which it can trigger and make decisions. These are the only two decision making times available to the ALL-NODE switch.

Turning now to the signal regeneration apparatus of the present invention, the implementation and timing are shown in FIGS. 10 and 11, respectively. When no data is being transmitted to a given input port of the switch 10m (FIG. 1), the INX-VALID signal associated with that input port to the switch is 0 and the INX-XMIT CLOCK to the same input port is 1 (steady state). In preparation for data transmission to switch 10m, the INX-VALID signal to the switch input port goes to 1 and remains there for the duration of the transfer. The data tranfer is actually started by the commencement of the clock pulse on the INX-XMIT CLOCK signal, as begun by the first transition to 0 of the clock pulse, as shown in FIG. 11. The sending node connected to the switch input port places the first 4 data bits on the data lines (INX-DATA0 to 3) to the switch 10m as it drives the clock line to 0 for the first time. The sending node transmits successive data in 4 bit groups to the switch everytime the clock line falls. The receiving switch 10m (stage 1 of the network in this example) becomes the intermediate receiver of the data from the sending node, and then in turn becomes the sender to the next stage of the switch network 30. As a intermediate receiver, the switch 10m clocks and latches the incoming data into latches 20 on the rise of the INX-XMIT CLOCK signal. As a sender, the switch 10m provides the latched data from latches 20 immediately to the selected output port. It also provides a redriven OUTX-VALID signal to the selected output port and a regenerated clock signal (OUTX-XMIT CLOCK), which is an inverse and reshaping of the INX-XMIT CLOCK to the input port.

The clock inverting and reshaping process is provided individually for each input port of the switch 10m by replications of the logic shown in FIG. 10. When no data is being received at switch 10m (INX-VALID=0), INX-XMIT CLOCK=1), the Disable Clock Input signal 9 is forced active (=1) by INX-VALID=0 into gate 9. Also INX-VALID to gate 7 forces gate 7=1 and drives gate 8=0. Gate 8=0 goes to gate 1 and forces it to 1. INX-VALID to gate 3 forces OUTX-XMIT CLOCK to 1, which in turn causes gate 2 to go to 0. This logic remains stable until INX-VALID=1 and INX-XMIT CLOCK goes to a zero to indicate the first data (Data1) is to be received from the incoming data lines (INX-DATA0 to 3). INX-XMIT CLOCK going to 0 causes inverter 6 to go to a 1 and gate 7 to go to 0. This causes gate 8 to go to 1 and gate 9 to 0. Gate 8 going to 1 enables gate 1 to go to 0, as soon as INX-XMIT CLOCK IN rises. Also, at this time gate 9 going to 0 removes one input from gate 5, but the OR state does not change at this time because the output of delay block 4 is still=1. When INX-XMIT CLOCK rises, it forces gate 1 to 0, gate 2 to 1, and gate 3 to 0 (inverse of gate 2). The rise of gate 2 clocks the data into latches which immediately drives the data lines (OUTX-DATA0 to 3) of the selected output port. A typical latch is shown by block 20D to be a dual flip-flop (DFF) circuit which latches the data present on the D input signal at the rise of Latch clock 2, and immediately makes the latched data available at output Q. Simultaneously, the OUTX-XMIT CLOCK signal 3 goes to 0 to indicate that data is being sent to the next stage of the network.

The reshaping comes from delay block 4 which is activated by gate 3 going to 0 and provides a fixed delay that controls the pulse width of the OUTX-XMIT CLOCK signal generated by gate 3. The logic loop involving gate 3, block 4, and gate 5 is tuned for the selected technology to provide a delay of 10 ns—thus controlling the generated pulse width to be 10 ns. However, due to the technology tolerances and variations across processes, the delay will not be exactly 10 ns, but will be within the tolerance that the technology can provide (in the order of +/−1 to 2 ns for 1 micron CMOS technology and probably even less for more advanced CMOS technologies). This means that the regenerated pulse will not be guaranteed to be a square wave of 10/10 ns, but will be somewhere between an 8/12 ns or a 12/8 ns unbalanced pulse. However, this inaccuracy will not affect the transmission from stage to stage as long as the next stage can generate and reshape the pulse within the same tolerance limit and the same frequency, and the repeatability of pulse generation at each stage is not hampered. It is important that the pulse shaping be controlled by the loop provided by gates 3, 4, and 5—and not affected by the INX-XMIT CLOCK signal going back to the 0 state. This is prevented by the latching action of gates 2 and 3, which provide a latching function that is only resettable by gate 5 or the INX-VALID signal going to 0. Gate 5 goes to a 0 after the 0 from gate 3 is delayed by block 4 and passed thru gate 5 to drive gate 3 back to the 1 state after being a zero for 8 to 12 ns. Gate 3 going to 1 drives gate 2 back to 0 because gate 1 has been driven to a 1 by the Enable Clock Input Signal being forced to 0 by gate 3 going to a 0 and gate 11 to a 1 after the rise of the INX-XMIT CLOCK signal (which drives gate 13 to 0, gate 9 to 1, gate 8 to 0, and gate 1 to 1). Before gate 8 can be forced back to the 1 state to enable gate 1 to look for the next rise of the INX-XMIT CLOCK signal, gate 7 must detect that INX-XMIT CLOCK has gone to the 0 state, OUTX-XMIT CLOCK (gate 3) has returned to the 1 state, and INX-VALID is still=1. When, these conditions are satisfied, gate 7 goes to 0 forcing gate gate 8 to a 1, and enabling gate 1 to look for the next rise of the INX-XMIT CLOCK signal to cause a latching of the next data byte and another reshaping of the next OUTX-XMIT CLOCK signal.

Clearly, the inventions which we have described by way of example and in illustration of our best mode of practicing the inventions in the various embodiments described provide a basis for much potential growth. Accordingly, it will be understood that those skilled in the art, both now and in the future, will envision further improvements even by way of invention, and these should be understood to be within the claimed scope which should be construed to protect and preserve the rights of the inventors.

What is claimed is:

1. A bufferless switching apparatus comprising:

a plurality of switch inputs and a plurality of switch outputs;

connection means for establishing a requested communication path between any one of the switch inputs and any one of the switch outputs in response to a connection request included in a data message received at said any one of the switch inputs, said communication path for transmitting the data message received at said any one of the switch inputs to said any one of the switch outputs;

said connection means including asynchronous connection means for establishing asynchronously a plurality of simultaneously active requested communication paths between a plurality of switch inputs and a plurality of switch outputs in response to a plurality of connection requests each included in one of a plurality of data messages received separately or simultaneously at said plurality of switch inputs, said simultaneously active communication paths for transmitting simultaneously said plurality of data messages to said plurality of switch outputs;

said requested communication path and said simultaneously active requested communication paths each comprising a plurality of data paths for transmitting the data message, and a plurality of control paths, one of the control paths for transmitting a clock signal in parallel with the data message, a first pulse of the clock signal triggering the transmission of data message bits; and a clock regeneration circuit at each switch input for receiving the data message and the clock signal and for transmitting a realigned data message and clock signal to said any one of the switch outputs, the clock regeneration circuit including delay means for adjusting a pulse width of the clock signal thereby aligning the clock signal and the data message bits for minimizing skew and pulse distortion between the clock signal and the data message bits.

2. The switching apparatus according to claim 1 wherein said plurality of switch inputs and switch outputs, said requested communication path, and said simultaneously active requested communication paths each comprise N data paths for transmitting N data message bits in parallel at each cycle of the clock signal, where N is a positive integer greater than one.

3. The switching apparatus according to claim 1 wherein a second of the control paths is for activating and deactivating said communication path, a third of the control paths is for communicating from said any one of the switch outputs back to said any one of the switch inputs a rejection signal indicating an unavailable requested switch output or indicating an unsuccessful data message transmission attempted on the established communication path, and a fourth of the control paths is for communicating from said any one of the switch outputs back to said any one of the switch inputs an acceptance signal indicating that a data message was successfully transmitted on the established communication path.

4. A multi-stage bufferless switching network comprising:

a plurality of bufferless switching apparatuses cascaded into stages, each said switching apparatus including a plurality of switch inputs and a plurality of switch outputs, each of the switch outputs of each said switching apparatus coupled to a different switch input of others of said switching apparatuses, switch outputs of last stage switching apparatuses comprising network output ports and switch inputs of first stage switching apparatuses comprising network input ports; and a plurality of nodes each coupled to one of the network output ports and to one of the network input ports, each node comprising means for receiving a data message and means for sending a data message including a connection request;

said switching apparatuses each including:

connection means for establishing a requested communication path between any one of the network input ports and any one of the network output ports in response to said connection request received at said any one of the network input ports, said communication path for transmitting a data message received at said any one of the network input ports to said any one of the network output ports, said connection means including asynchronous connection means for establishing asynchronously a plurality of simultaneously active requested communication paths between a plurality of network input ports and a plurality of network output ports in response to a plurality of connection requests received separately or simultaneously at said plurality of network input ports, said simultaneously active communication paths for transmitting simultaneously a plurality of data messages received separately or simultaneously at said plurality of network input ports to said plurality of network output ports; and said requested communication path and said simultaneously active requested communication paths each comprising a plurality of data paths for transmitting the data message, and a plurality of control paths, one of the control paths for transmitting a clock signal in parallel with the data message, a first pulse of the clock signal triggering the transmission of data message bits.

5. The switching network according to claim 4, wherein said switching apparatuses each further include a clock regeneration circuit at each switch input for receiving the data message and the clock signal and for transmitting a realigned data message and clock signal to said any one of the network output ports, the clock regeneration circuit including delay means for adjusting a pulse width of the clock signal thereby aligning the clock signal and the data message bits for minimizing skew and pulse distortion between the clock signal and the data message bits.

6. The switching network according to claim 4, wherein said plurality of switch inputs and switch outputs, said requested communication path, and said simultaneously active requested communication paths each comprise N data paths for transmitting N data message bits in parallel at each cycle of the clock signal, where N is a positive integer greater than one.

7. A bufferless switching network comprising:

a plurality of switch inputs and a plurality of switch outputs;

a plurality of nodes each coupled to one of the switch outputs and to one of the switch inputs, each node comprising means for receiving a data message from a coupled switch output and means for sending a data message to a coupled switch input, the data message to a coupled switch input including a connection request;

said bufferless switching network including connection means for establishing a requested communication path between any one of the switch inputs and any one of the switch outputs in response to said connection request received at said any one of the switch inputs, said communication path for transmitting a data message received at said any one of the switch inputs to said any one of the switch outputs;

said connection means including asynchronous connection means for establishing asynchronously a plurality of simultaneously active requested communication paths between a plurality of switch inputs and a plurality of switch outputs in response to a plurality of connection requests received separately or simultaneously at said plurality of switch inputs, said simultaneously active communication paths for sending simultaneously a plurality of data messages received separately or simultaneously at said plurality of switch inputs to said plurality of switch outputs; and said requested communication path and said simultaneously active requested communication paths each comprising a plurality of data paths for transmitting the data message, and a plurality of control paths, one of the control paths for transmitting a clock signal in parallel with the data message, a first pulse of the clock signal triggering the transmission of data message bits; and a clock regeneration circuit at each switch input for receiving the data message and the clock signal and for transmitting a realigned data message and clock signal to said any one of the switch outputs, the clock regeneration circuit including delay means for adjusting a pulse width of the clock signal thereby aligning the clock signal and the data message bits for minimizing skew and pulse distortion between the clock signal and the data message bits.

8. The switching network according to claim 7 wherein said plurality of switch inputs and switch outputs, said requested communication path, and said simultaneously active requested communication paths each comprise N data paths for transmitting N data message bits in parallel at each cycle of the clock signal, where N is a positive integer greater than one.

9. The switching network according to claim 7 wherein a second of the control paths is for activating and deactivating said communication path, a third of the control paths is for communicating from said any one of the switch outputs back to said any one of the switch inputs a rejection signal indicating an unavailable requested switch output or indicating an unsuccessful data message transmission attempted on the established communication path, and a fourth of the control paths is for communicating from said any one of the switch outputs back to said any one of the switch inputs an acceptance signal indicating that a data message was successfully transmitted on the establish ed communication path.

* * * * *